United States Patent Office 3,207,435
Patented Sept. 21, 1965

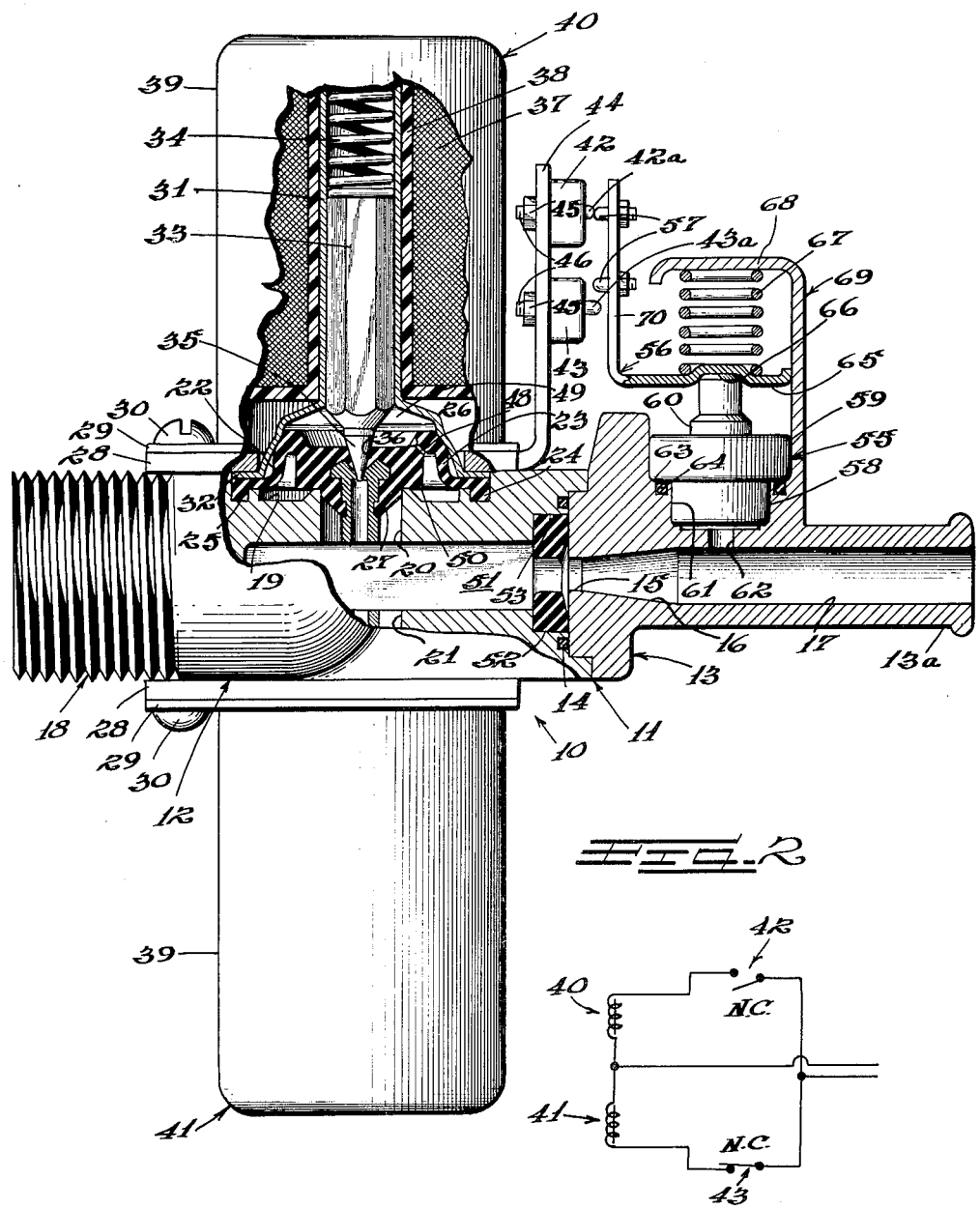

3,207,435
THERMOSTATIC LIMIT CONTROL VALVE
Howard L. Erickson, Bensenville, Joseph M. Algino, Chicago, and Robert W. Couffer, Deerfield, Ill., assignors to The Dole Valve Company, Morton Grove, Ill., a corporation of Illinois
Filed Oct. 17, 1963, Ser. No. 316,898
6 Claims. (Cl. 236—12)

The present invention relates to thermostatic fluid control valves and more particularly relates to a control valve having electrically actuable valve means for the hot and cold fluid inlets thereto which are energizable through switches controlled by the action of a temperature sensitive element disclosed in heat transfer relation with fluid flowing through the valve.

In accordance with the present invention a valve body provided with a pair of hot and cold fluid inlets and a common outlet is provided with electrically actuable valve means at each of the inlets and switch means are connected in circuit with the valve means so that as the switches are actuated the valve means will in turn act to control the rate of flow of the hot and cold fluids through the valve. A switch actuator is provided for actuating the switches and is, in turn, operated by a temperature sensitive power unit which is disposed within the valve so as to be sensitive to the temperature of fluid on the downstream side of the inlet valves.

The switching means is designed so that one or both of the hot and cold valve means will at all times be in a "port open" position. In addition, the temperature sensitive power unit is so positioned with respect to the fluid flow passage through the valve so as not to impede the flow of fluid therethrough.

In view of the foregoing it is principal object of the present invention to provide an electrically controlled temperature sensitive fluid control valve.

Another object of the invention relates to the provision of a thermostatic fluid control valve having a temperature sensing element positioned out of the path of fluid flow so as not to impede the flow of fluid through the valve.

A still further object of the present invention relates to the provision of a thermostatic fluid control valve having separate electrically actuable valve means for the hot and cold fluid inlets thereto and having temperature sensing means for controlling electrical actuation of those valve means as a function of the temperature of fluid flowing through the valve.

These and other objects, advantages and features of the present invention will become apparent from time to time as the following specification proceeds and with reference to the accompanying drawings, wherein:

FIGURE 1 is a partially sectioned side elevational view of a thermostatic limit control valve constructed in accordance with the principles of the present invention; and FIGURE 2 is a schematic wiring diagram for the structure illustrated in FIG. 1.

As shown on the drawings:

A fluid control valve assembly 10 comprises a two-part valve body 11 including a chambered inlet block 12 and an outlet block 13 which is secured thereto in a known manner and which terminates in a connecting nipple 13a at the outer or downstream end thereof. A sealing ring 14 is interposed between the blocks 12 and 13 to provide a fluid tight seal therebetween.

A small diameter outlet port 15 opens from the upstream end of the outlet block 13 through a diverging wall section 16 to a cylindrical outlet passage 17. The flow passageway thus formed through the outlet block 15 provides an unimpeded flow path for fluid traveling through the valve. A hot water inlet nipple 18 is formed integrally with the inlet block 12 and has an identical cold water inlet positioned adjacent to it which cannot be seen in the drawing. The hot water inlet nipple has a passageway formed therein which is communicable with an annular trough 19 surrounding a vertical flow port 20 formed within the block 12. In a like manner, the cold water inlet nipple has a passageway formed therethrough which is communicable with an annular trough formed on the opposite side of the block 12 and surrounding a vertical flow port 21 which is coaxial with the flow port 20.

Identical fluid pressure actuated diaphragm valve members 22 are cooperable with the ports 20 and 21 to control the flow of hot and cold fluids therethrough.

Diaphragm valves 22 comprise relatively thin resilient membranes 23 having peripheral beads 24 formed therearound and seated within bead grooves 25 formed in the inlet block 12 around the shallow troughs 19. Each membrane 23 has a central thickened portion 26 which constitutes the valve head and from which depends in a downwardly converging direction a conical section 27 which is adapted to be positioned within their respective vertical flow ports 20, 21. The peripheral bead 24 is maintained in a clamped sealed position in the bead groove 25 by a bracket 28 and solenoid cover 29 which are sandwiched together and screwed into the inlet block 12 by screws 30 extending therethrough.

As is well known in the art of valve manufacture, armature guide 31 is positioned over the diaphragm valve 22 coaxially thereof and has an outturned flange 32 at its lower end clamped between the peripheral edge of the diaphragm valve member 22 and the bracket 28. The guide 31 is closed at its upper end and has an armature 33 (octagonal in horizontal cross-section) slidably guided therein. A compression spring 34 is interposed between the uppermost end of the armature guide 31 and the armature 33 to bias the pointed valve head 35 at the lowermost end of the armature 53 into a seated position in a central flow port 36 formed in the diaphragm valve member 22. A solenoid coil 37 is wound on a bobbin 38 which, in turn, is fitted over the guide 31 and the entire assembly is encased within the solenoid cover 39.

The hot water solenoid assembly 40 extending upwardly from the valve body 11 and the cold water solenoid assembly 41 which depends therefrom are energized through the control of a pair of electric switches 42 and 43, respectively, which are each secured to an upturned leg 44 of the bracket 28 by means of nuts 45 which are threaded on the protruding ends of screws 46 extending through the leg 44 from each of the switches. The switches 42, 43 are each normally closed switches which are respectively connected in circuit with the electrical coils in the solenoid assemblies 40, 41 respectively. The switches have actuating plungers 42a, 43a which when depressed will move the contact member to an open circuit position and thus effect deenergization of the electrical coil connected therewith and cause the armature of that coil to be moved to a diaphragm valve seated position as is shown in FIGURE 1.

As is well understood by those skilled in the valve art, the diaphragm valve 22 has a bleed port or ports 48 formed therein, the total combined flow area of which is less than the flow area of the central enlarged port 36 so that upon movement of the armature 33 to a retracted position caused by energization of the electrical coil 37, water will pass from the chamber 49 formed above the diaphragm valve member 22 to and through the central port 36 to the downstream side of the valve member faster than fluid will flow through the bleed ports 48 and the net force acting across the diaphragm valve member will be an upward one so that the central thickened portion 26 of the valve member will be unseated from the annular seat 50 formed about the port 20 by the differential in fluid pressure acting across the valve.

It will be understood that the bleed port or ports 48 are formed radially outwardly of the central port 36 and that when the diaphragm valve member 22 is in an unseated position there will be a low pressure area or vortex created immediately over the area of the flow port 20 so that upon seating of the armature valve 35 the pressure of fluid above the diaphragm valve member will be relatively great because of the fact that it is communicated to the chamber 49 through the bleed ports 48 which overlie a relatively high pressure area below the valve and the net force across the valve will be a downward one, thereby causing the diaphragm valve member 22 to be seated once again. Fluid flowing through the ports 20 and 21 travel directly into the mixing chamber 51 and then passes through a resilient annular flow control member 52 seated within an enlarged bore 53 before passing to and through the outlet passageway 17.

The means for effecting actuation of the solenoid assembly in accordance with the temperature of liquid passing through the valve 10 comprises generally a temperature sensitive power unit 55 and a bracket 56 carrying a pair of switch actuators 57, which bracket is moved by the temperature sensitive power unit 55 in direct response to the temeprature of fluid falling through the outlet passageway 17.

The temperaure sensitive power unit 55 is of the well-known solid fill type and includes a temperature sensing portion 58 containing a microcrystalline wax or the like which is fusible and expansible upon increases in temperature and in the sensing portion 58, an enlarged collar 59, a power member guide 60, and a piston or power member (not shown) which is guided for slidable movement within the guide 60 and which is extensible therefrom upon increases in temperature ambient the sensing portion 58. The power unit 55 is mounted on the outlet block 13 with its temperature sensing portion 58 disposed within a well 61 formed in the outlet block 13 and communicable through a passage 62 with the outlet passageway 17. The collar 59 seats upon an annular shoulder 63 and compresses a sealing ring 64 which is carried within a groove formed within the shoulder to provide a fluid tight seal between the outlet block 13 and the power unit 55. The well 61 is somewhat deeper than the depth of the sensing portion 58 so that fluid is free to travel all around the under surface of the sensing portion. If desired, the unit could be mounted within the outlet block so that fluid would be free to travel entirely around both the bottom and the side walls of the sensing unit 58 but this, of course, woulld be dictated by the response and special requirements required.

The bracket 56 has a horizontally extending portion 65 which is dished as at 66 to provide for proper seating of the bracket on the guide 60 and to provide for proper centering of a compression spring 67. The compression spring 67 is interposed between the horizontally extending portion 65 of the bracket 56 and a leg 68 of bracket 69 which extends around and over the power unit 55. The spring 67 thus serves to seat the bracket 56 in position thereon. The bracket 56 has switch actuators or cams 57 mounted on an upstanding portion 70 thereof and these actuators are cooperable respectively with the switch plungers 42a and 43a to effect depression of them.

The switch actuator 57 could obviously comprise a single cam element if desired.

It will however be understood that the spacing between the uppermost and lowermost actuating surfaces of the actuators is such that one of the two plungers 42a or 43a is at all times in an undepressed condition irrespective of the position of the bracket 56.

Assuming that both the hot and cold diaphragm valves are initially in an open position but that because of pressure differentials or other factors, the temperature of the mixed water passing from the mixing chamber 51 to and through the outlet passageway 17 begins to increase the power member within the power unit 55 will begin to move extensively because of an increase in temperature ambient the sensing portion 58. Such extensible movement of the power member will move the actuating element 57 into engagement with plunger 42a to effect depression thereof and open that switch to deenergize the electrical coil 37. Upon deenergization of coil 37 the valve member 22 will be seated in the manner above explained and the flow of hot water to the mixing chamber 51 will stop. Only cold water will then be fed through the valve. This of course will cause the power member to be moved retractibly immediately by the spring 67 and when the plunger 42a is again permitted to move to its normal extended position the hot water solenoid will again be energized and mixed water will then flow through the valve. If for some reason the temperature of the mixed water continues to get colder, the power member within power unit 55 will move retractibly to an extent such that depression of plunger 43a will take place. At that time cold water flow through the valve will be cut off and the opposite action will take place.

It will be understood that this embodiment has been used for illustrative purposes only and that various modifications and variations in this invention may be effected without departing from the spirit and scope of the novel concepts thereof.

We claim as our invention:

1. A fluid control valve comprising:
  a valve body having hot and cold fluid inlet ports,
  a mixing chamber communicable with said inlet ports,
  an outlet communicable with said mixing chamber,
  valve members cooperable with each of said ports to control fluid flow therethrough,
  spring means biasing said valve members to port closing positions,
  electrically energizable means cooperable with each of said valve means and effective when energized to unseat their respective valve means from the said ports,
  normally closed electrical switches wired in circuit with said electrically energizable means for controlling energization thereof and having depressible actuating elements depressible to open the circuit to their respective electrically energizable means,
  a well mounted in said valve body adjacent said outlet and in constant open communication with said outlet,
  a temperature sensitive power unit having a temperature sensing portion mounted within and sealed to said valve body and positioned within said well in heat transfer relationship with the fluid within said well,
  said power unit having a power member mounted therein and extensible therefrom upon predetermined temperature conditions ambient said sensing portion,
  a switch actuator abutting said power member and movable thereby and having at least one camming element engageable with each of said depressible actuating elements one at a time to control operation of said valve means as a function of the temperature of fluid within said outlet.

2. A fluid control valve constructed in accordance with claim 1 wherein said electrical switches are mounted on said valve body, and wherein said temperature sensitive power unit is mounted within said valve body with its power member movable in a plane perpendicular to the axes of the depressible actuating elements, and wherein said switch actuator comprises an L-shaped bracket having at least one camming element mounted on one leg thereof and having its opposite end biased into abutment with said power member by a power member return spring carried on the said valve body.

3. A thermostatic fluid control valve comprising:
  a valve body having hot and cold fluid inlet passageways,
  an outlet in communication with said passageways, electrically actuable valve means at each of said passageways for controlling fluid flow therethrough,
a pair of normally closed open-close electrical switches each connected in circuit with one of said valve means for normally opening both of said valves,
a temperature sensitive power unit having a temperature sensing portion mounted on said valve body in heat transfer relationship with the fluid within said outlet and having a power member extensible therefrom upon predetermined temperature conditions and in said sensing portion thereof, and
a switch actuator mounted on said power member and movable therewith to selectively engage one of said switches to close one of said valve means and maintain the other of said valve means open as a function of the temperature of fluid within said outlet.

4. A thermostatic fluid control valve comprising:
a valve body having hot and cold fluid inlets and having an outlet in communication with said inlets,
electrically actuable valve means at each of said inlets for controlling the flow of fluid therethrough,
a pair of normally closed electrical switches each connected in circuit with one of said valve means for controlling energization thereof and having actuator elements movable to open the circuit to their respective valve means,
wherein said valve means are maintained in a full flow position when energized,
a temperature sensitive power unit having a temperature sensing portion mounted on said valve body in heat transfer relationship with the fluid within said outlet and having a power member extensible therefrom upon predetermined temperature conditions and in said sensing portion thereof, and
a switch actuator engageable with each of said elements one at a time to move same as function of the temperature of fluid within said outlet.

5. A thermostatic fluid control valve comprising:
a valve body having hot and cold fluid inlets and having an outlet in communication with said inlets,
electrically actuable valve means at each of said inlets for controlling fluid flow therethrough,
a pair of normally closed open-close electrical switches each connected in circuit with one of said valve means for normally opening both of said valves,
a fluid well formed within said valve body in open communication with said outlet,
a thermosensitive power unit mounted within said valve body and having a temperature sensing portion positioned within said well in heat transfer relationship with the fluid contained therein and having a plunger extensible therefrom upon predetermined temperature conditions ambient said sensing portion, and
a switch actuator mounted on said plunger and movable therewith to selectively engage one of said switches to close one of said valves as a function of the temperature of fluid within said well.

6. A fluid control valve comprising:
a valve body having hot and cold fluid inlet ports,
a mixing chamber communicable with said inlet ports,
an outlet communicable with said mixing chamber,
valve members cooperable with each of said ports to control fluid flow therethrough,
electrically energizable means cooperable with each of said valve means and effective when energized to unseat their respective valve means from the said ports,
a pair of normally closed electrical switches each wired in circuit with one of said electrically energizable means for controlling energization thereof and said switches having depressible actuating elements depressible to open the circuit to their respective electrically energizable means,
a temperature sensitive power unit having a temperature sensing portion mounted within and sealed to said valve body and positioned within said well in heat transfer relationship with the fluid within said well,
said power unit having a power member mounted therein and extensible therefrom upon predetermined temperature conditions ambient said sensing portion,
a switch actuator abutting said power member and movable thereby and having at least one camming element selectively engageable with each of said depressible actuating elements one at a time to control operation of said valve means as a function of the temperature of fluid within said outlet.

References Cited by the Examiner

UNITED STATES PATENTS

| | | | |
|---|---|---|---|
| 775,021 | 11/04 | Waterman | 236—12 |
| 2,280,667 | 4/42 | Scott et al. | |
| 2,624,325 | 1/53 | Fricke et al. | 200—140 X |
| 2,711,458 | 6/55 | Eskin | 200—140 |
| 2,830,766 | 4/58 | Algino | 236—12 |
| 2,844,320 | 7/58 | Cate | 236—12 |
| 2,844,321 | 7/58 | Witherspoon | 236—12 |
| 2,978,181 | 4/61 | Noakes | 236—12 |

EDWARD J. MICHAEL, *Primary Examiner.*
ALDEN D. STEWART, *Examiner.*